US012732713B2

(12) United States Patent
Inada

(10) Patent No.: US 12,732,713 B2
(45) Date of Patent: Sep. 8, 2026

(54) COMPUTER SYSTEM, METHOD, AND PROGRAM

(71) Applicant: Sony Interactive Entertainment Inc., Tokyo (JP)

(72) Inventor: Tetsugo Inada, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 18 days.

(21) Appl. No.: 18/845,558

(22) PCT Filed: Mar. 29, 2022

(86) PCT No.: PCT/JP2022/015252
§ 371 (c)(1),
(2) Date: Sep. 10, 2024

(87) PCT Pub. No.: WO2023/187951
PCT Pub. Date: Oct. 5, 2023

(65) Prior Publication Data
US 2025/0184629 A1 Jun. 5, 2025

(51) Int. Cl.
*H04N 25/47* (2023.01)
*H04N 25/671* (2023.01)

(52) U.S. Cl.
CPC ........... *H04N 25/47* (2023.01); *H04N 25/671* (2023.01)

(58) Field of Classification Search
CPC ........ G01S 17/86; G01S 17/894; G01S 7/497; H04N 25/47; H04N 25/671
See application file for complete search history.

(56) References Cited

U.S. PATENT DOCUMENTS 9,489,575 B1* 11/2016 Whalen .................. G01C 23/00
2015/0178928 A1* 6/2015 Mika ......................... G06T 7/74 348/142
2021/0144356 A1* 5/2021 Macmillan ........... H04N 13/239
2022/0413112 A1* 12/2022 Katou ................... G01S 7/4972
2024/0090759 A1* 3/2024 Kuroda .................. A61B 1/042

FOREIGN PATENT DOCUMENTS

CN 101208959 A 6/2008
JP 2002-080852 A 3/2002
JP 2019-078748 A 5/2019
JP 2020-056635 A 4/2020

OTHER PUBLICATIONS

International Search Report and Written Opinion mailed on May 24, 2022, received for International Application No. PCT/JP2022/015252, filed on Mar. 29, 2022, 08 pages including English Translation.

* cited by examiner

*Primary Examiner* — Amy R Hsu
(74) *Attorney, Agent, or Firm* — Kilpatrick Townsend & Stockton LLP

(57) ABSTRACT

Provided is a computer system for processing sensor output generated for each pixel, which includes a memory for storing a program code, and a processor for executing operations according to the program code, and the operations include calculating a position correction amount for the pixel position of the sensor according to an event signal generated by an event-based vision sensor having a known positional relation with the sensor, and applying the position correction amount to the sensor output.

19 Claims, 4 Drawing Sheets

COMPUTER SYSTEM, METHOD, AND PROGRAM

CROSS-REFERENCE TO RELATED APPLICATION

The present application is a national stage application, pursuant to 35 U.S.C. § 371, of International Patent Application No. PCT/JP2022/015252, filed Mar. 29, 2022, the entire contents of which are incorporated herein by reference.

TECHNICAL FIELD

The present invention relates to a computer system, a method, and a program.

BACKGROUND ART

A ToF (Time of Flight) sensor that measures distance on the basis of the time of flight of light is used, for example, to obtain three-dimensional information on an object, and is roughly divided into a dToF (direct ToF) method that measures a time difference until reflected light is detected, and an iToF (indirect ToF) method that measures distance by accumulating reflected light and detecting a phase difference with respect to the emitted light. The technology related to ToF sensors is described in PTL 1, for example. In the technology described in PTL 1, a depth image acquisition device includes a light-emitting diode that emits modulated light toward a detection area, a ToF sensor that receives incident light reflected by an object existing in the detection area, and outputs a signal for generating a depth image, and a filter that allows a relatively large amount of light of a predetermined wavelength band to pass therethrough among several types of the incident light, and at least one of the light-emitting diode, ToF sensor, and arrangement of the filter is controlled according to a temperature of the light-emitting diode or the ToF sensor.

CITATION LIST

Patent Literature

[PTL 1]
JP 2019-078748A

SUMMARY

Technical Problem

In the above-mentioned ToF sensor, since it is necessary to increase the light collecting area per pixel to a certain extent, there is a limit to how much the pixel interval can be reduced. Therefore, it is not easy to increase the spatial resolution of the ToF sensor. A similar situation can occur not only in the ToF sensor, but also in any sensor in which it is difficult to reduce the pixel interval.

Accordingly, an object of the present invention is to provide a computer system, a method, and a program that make it possible to increase the spatial resolution of the output even in a sensor in which it is difficult to reduce the pixel interval.

Solution to Problem

According to one aspect of the present invention, provided is a computer system for processing an output of a sensor generated for each pixel, which includes a memory for storing a program code and a processor for executing operations in accordance with the program code, and the above-mentioned operations include calculating a positional correction amount for a pixel position of the sensor according to an event signal generated by an event-based vision sensor that has a known positional relation with the sensor, and applying the positional correction amount to the output of the sensor.

According to another aspect of the present invention, provided is a method for processing an output of a sensor generated for each pixel, which includes, by a processor executing operations according to a program code stored in a memory, calculating a positional correction amount for a pixel position of the sensor according to an event signal generated by an event-based vision sensor that has a known positional relation with the sensor, and applying the positional correction amount to the output of the sensor.

According to yet another aspect of the present invention, provided is a program for processing an output of a sensor generated for each pixel, and operations executed by a processor in accordance with the program includes calculating a position correction amount for a pixel position of the sensor according to an event signal generated by an event-based vision sensor that has a known positional relation with the sensor, and applying the position correction amount to the output of the sensor.

DESCRIPTION OF EMBODIMENTS

Figure 1:
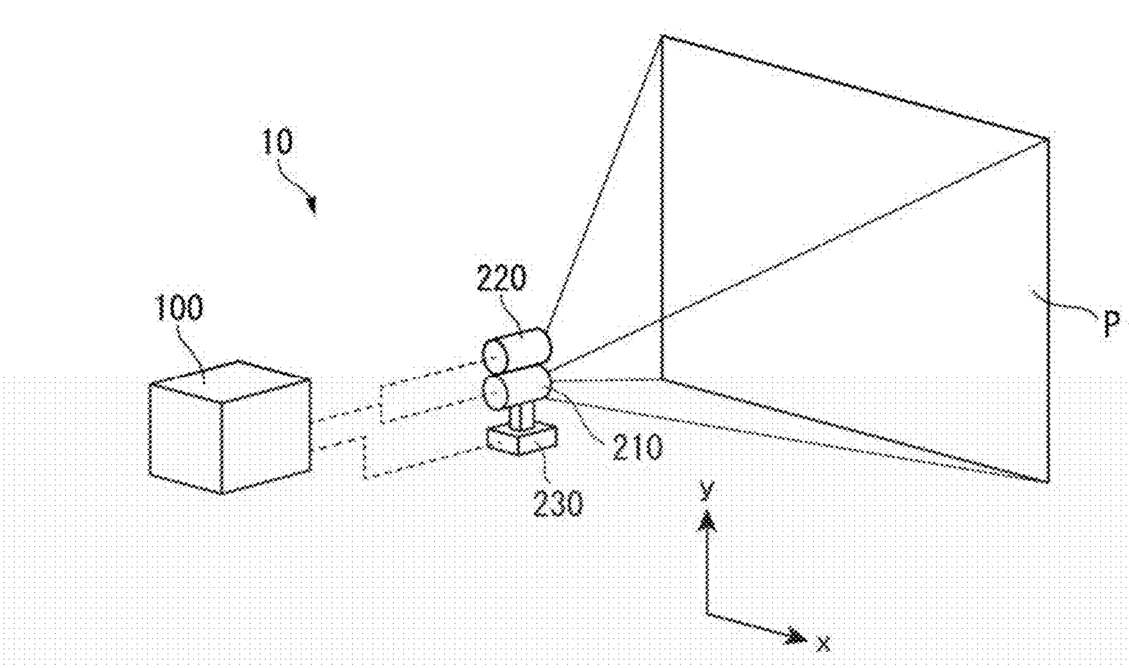
FIG. 1 is a diagram illustrating an example of a system according to an embodiment of the present invention.

Hereinafter, some embodiments of the present invention will be described in detail with reference to the accompanying drawings. It should be noted that in the present description and the drawings, components having substantially the same functional configurations are designated by the same reference numerals, and duplicated descriptions will be omitted.

FIG. 1 is a diagram illustrating an example of a system according to an embodiment of the present invention. In the illustrated example, a system 10 includes a computer 100, a dToF (direct Time of Flight) sensor 210, an event-based vision sensor (EVS; Event-based Vision Sensor) 220, and an actuator 230. The computer 100 is a game machine, personal computer (PC), or server device connected to a network, for example. The dToF sensor 210 obtains depth information by irradiating an object with a laser light and measuring a time difference until the reflected light is received. In the illustrated example, the pixels for measurement by the dToF sensor 210 are arranged along a plane including an x direction and a y direction in the figure (schematically illustrated as a pixel area P). The EVS 220 is arranged such that a positional relation with the dToF sensor 210 is known. To be more specific, the dToF sensor 210 and the EVS 220 are rigidly connected. The actuator 230 applies displacements to the dToF sensor 210 and the EVS 220. Since a positional relation between the dToF sensor 210 and the EVS 220 is known as described above, the displacements applied to the dToF sensor 210 and the EVS 220 by the actuator 230 are the same or can be converted into each other.

Figure 2:
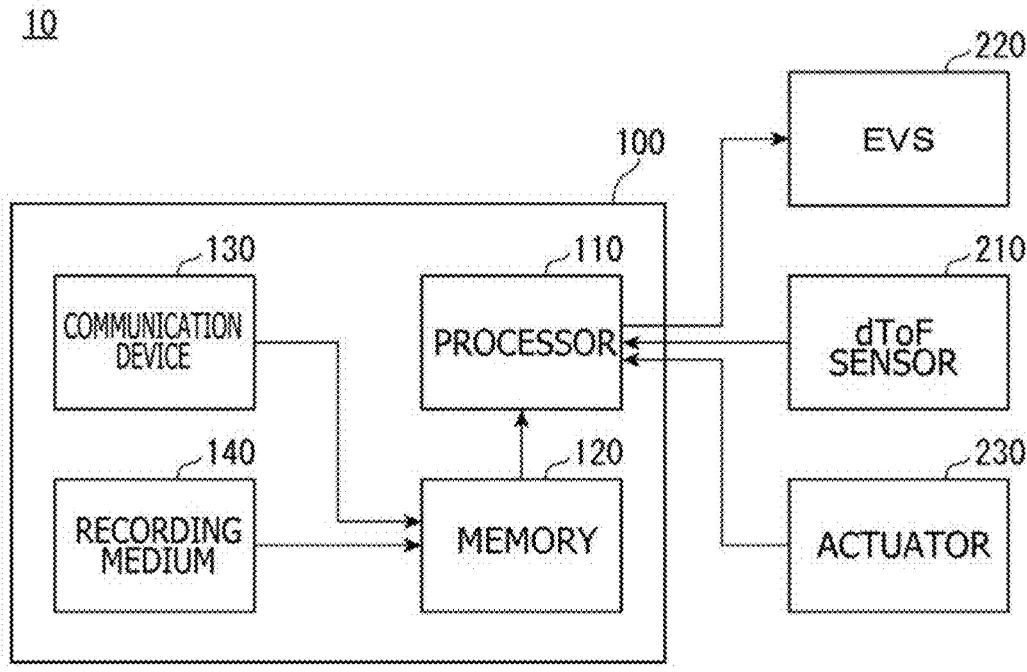
FIG. 2 is a diagram illustrating a device configuration of the system illustrated in FIG. 1.

FIG. 2 is a diagram illustrating a device configuration of the system illustrated in FIG. 1. The computer 100 includes a processor 110 and a memory 120. The processor 110 is configured by a processing circuit such as a CPU (Central Processing Unit), a DSP (Digital Signal Processor), an ASIC (Application Specific Integrated Circuit), and/or an FPGA (Field-Programmable Gate Array). Further, the memory 120 is configured by storage devices such as various ROMs (Read Only Memories), RAMS (Random Access Memories), and/or HDDs (Hard Disk Drives). The processor 110 operates in accordance with program codes stored in the memory 120. The computer 100 further includes a communication device 130 and a recording medium 140. For example, a program code for the processor 110 to operate as described below may be received from an external device via the communication device 130 and stored in the memory 120. Alternatively, the program code may be read into the memory 120 from the recording medium 140. The recording medium 140 includes, for example, a removable recording medium such as a semiconductor memory, a magnetic disk, an optical disk, or a magneto-optical disk, and a driver for the medium.

The dToF sensor 210 includes a light source of laser light and a light receiving element arranged for each pixel, and outputs a result of measurement of the time difference until the laser light emitted from the light source is received as reflected light for each pixel. The EVS 220 is also called an EDS (Event Driven Sensor), an event camera, or a DVS (Dynamic Vision Sensor), and includes a sensor array that has sensors including light receiving elements. When detecting a change in the intensity of the light incident on the sensor, more specifically, a change in the luminance of the object surface, the EVS 220 generates an event signal including a time stamp, sensor identification information, and information on the polarity of the luminance change. The actuator 230 gives a displacement to the sensor unit including the dToF sensor 210 and the EVS 220 according to the control of the processor 110. The displacement provided by the actuator 230 may be a displacement due to parallel shift or a rotational displacement. The actuator 230 may be something like a vibrator that vibrates the dToF sensor 210 and the EVS 220.

Figure 3:
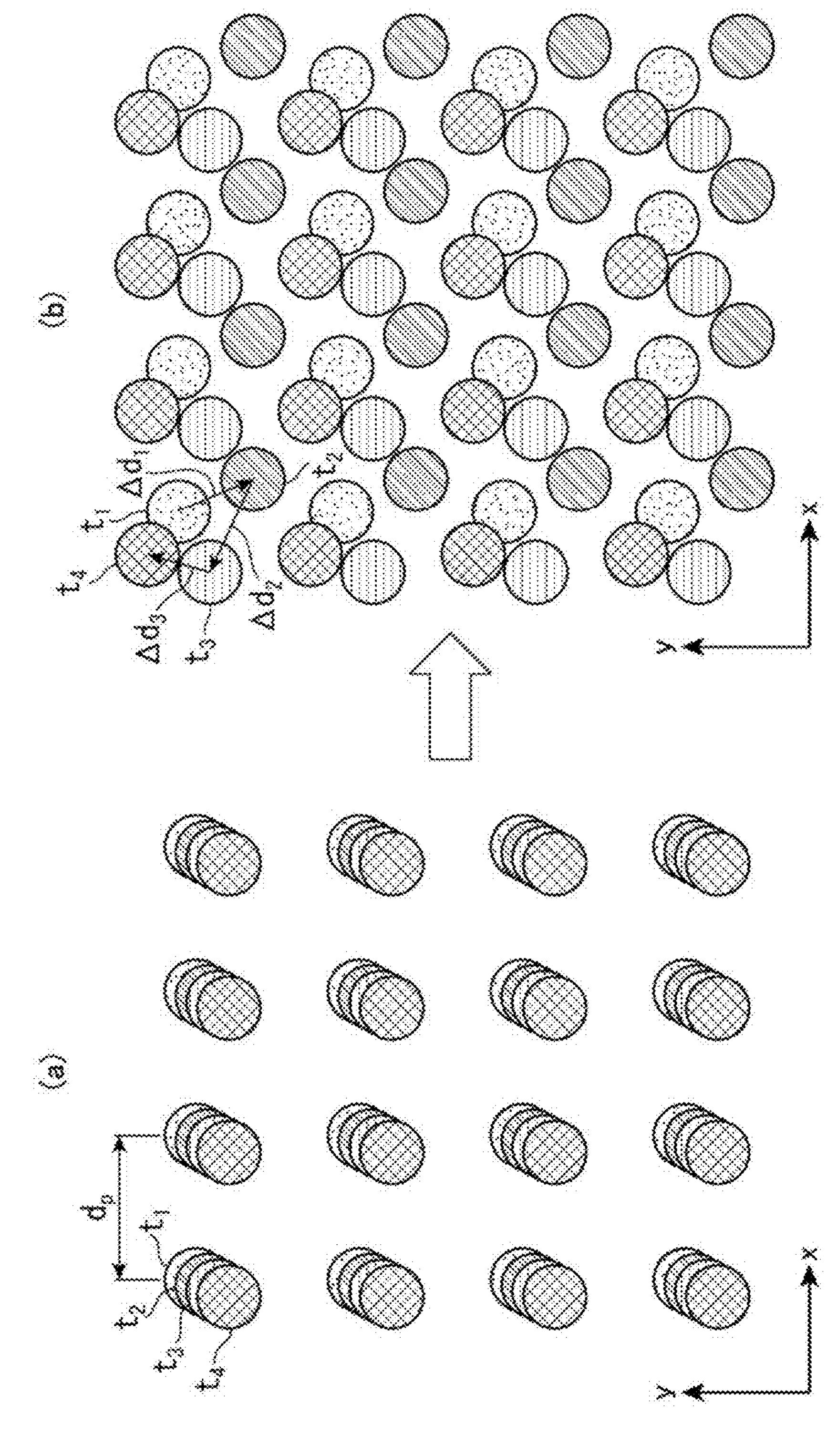
FIG. 3 is a diagram for conceptually describing processing executed in the system illustrated in FIG. 1.

FIG. 3 is a diagram for conceptually describing the processing executed in the system illustrated in FIG. 1. Part (a) of FIG. 3 is a diagram illustrating a time series distribution of pixel positions in the case where no displacement is provided to the dToF sensor 210 in the system 10 of FIG. 1. In the dToF sensor 210, a laser light source and a light receiving element are arranged for each pixel, and it is necessary to increase the light collecting area per pixel for detecting reflected light, so that the pixel interval $d_p$ is larger than that of other sensors such as the EVS 220 and the RGB camera. In the case of part (a) of FIG. 3, since no displacement is provided to the dToF sensor 210, measurements are performed at times $t_1$, $t_2$, $t_3$, and $t_4$ at lattice points having a pixel interval $d_p$. In this case, the spatial resolution is $1/d_p$. On the other hand, part (b) of FIG. 3 is a diagram illustrating the time series distribution of pixel positions in the case where a displacement is provided to the dToF sensor 210. In the illustrated example, by applying displacement amounts $\Delta d_1$, $\Delta d_2$, and $\Delta d_3$ smaller than the pixel interval $d_p$, the positions at which measurements are performed at the times $t_1$, $t_2$, $t_3$, and $t_4$ for each pixel are shifted slightly. As a result, measurements are performed at intervals smaller than the pixel interval $d_p$ in a time-division manner, and the spatial resolution of the dToF sensor 210 is higher than $1/d_p$.

In order to increase the spatial resolution of the dToF sensor 210 by time-division measurement as described above, the displacement amounts $\Delta d_1$, $\Delta d_2$, and $\Delta d_3$ must be known. For this purpose, an event signal generated by the EVS 220 is used in the present embodiment. As described above, the EVS 220 generates an event signal when detecting a luminance change on the surface of an object. When a displacement is provided to the EVS 220 together with the dToF sensor 210, a luminance change occurs on the surface of the object as seen from the EVS 220 due to a change in a positional relation between the EVS 220 and the object, and an event signal is generated. The displacement amount given to the EVS 220 can be calculated backward from the moving speed of the position where the luminance change occurs. At this time, for example, the depth information of the object measured by the dToF sensor 210 may be used to more accurately calculate the displacement amount given to the EVS 220 by considering a depth of the object, that is, the distance from the EVS 220 to the object. As described above, since the positional relation between the dToF sensor 210 and the EVS 220 is known, the displacements applied to the respective sensors are the same or can be converted into each other. Therefore, the displacement amounts $\Delta d_1$, $\Delta d_2$, and $\Delta d_3$ of each pixel of the dToF sensor 210 and the position correction amounts corresponding to these can be calculated from the displacement amount applied to the EVS 220.

In addition, in order to increase the spatial resolution of the dToF sensor, there is also a method of controlling the actuator to give the displacement amounts $\Delta d_1$, $\Delta d_2$, and $\Delta d_3$, unlike the above example. However, in this case, it is necessary to increase the accuracy of the control and calibration of the actuator, and to accurately synchronize the displacement by the actuator with the measurement by the dToF sensor. In contrast, since the displacement amount is calculated afterwards from the event signal generated by the EVS 220 in the present embodiment, it is not necessary to accurately control the displacement amount given by the actuator 230, and it is not necessary to accurately synchronize the displacement by the actuator 230 with the measurement by the dToF sensor 210. In addition, the displacement given by the actuator 230 does not necessarily have to be from a regular vibration and may be an irregular displacement.

The EVS 220 has high time resolution and high spatial resolution, and can therefore detect a displacement amount smaller than the pixel interval of the dToF sensor 210. In the present embodiment, the units of the displacement amounts $\Delta d_1$, $\Delta d_2$, $\Delta d_3$ and the position correction amounts corresponding to these are smaller than the pixel interval $d_p$ of the sensor, so that the measurement is performed in a time-division manner while the pixel position is shifted at intervals smaller than the pixel interval $d_p$ (e.g., $\frac{1}{2}d_p$, $\frac{1}{3}d_p$, $\frac{2}{3}d_p$, . . . ), thereby making it possible to increase the spatial resolution of the dToF sensor 210.

It is to be noted that in the example illustrated in FIG. 3, the dToF sensor 210 is provided with random displacement amounts $\Delta d_1$, $\Delta d_2$, and $\Delta d_3$ including components in both the x and y directions, but in other examples, the actuator 230 may give a predominant displacement in the x, y, or other specific direction.

For example, in the case where the system 10 is mounted in a moving body such as a vehicle or a self-propelled robot, a predominant displacement may be given in a direction perpendicular to the moving direction, for example, since a displacement has already occurred in the moving direction of the moving body (i.e., if the moving direction is the x direction, a predominant displacement is given in the y direction). Here, a predominant displacement in a specific direction means a displacement that occurs only in a specific direction, or occurs more significantly in a specific direction than in other directions.

Also, the actuator 230 may use different types of displacement, for example. To be specific in the case where the actuator 230 applies a rotational displacement to the dToF sensor 210 and the EVS 220, for example, the angle of view changes significantly, thereby allowing a wide range to be measured. On the other hand, in the case where the actuator 230 applies a displacement due to a parallel shift to the dToF sensor 210 and the EVS 220, the change in the angle of view is small, thereby allowing a narrow range to be measured in detail.

Figure 4:
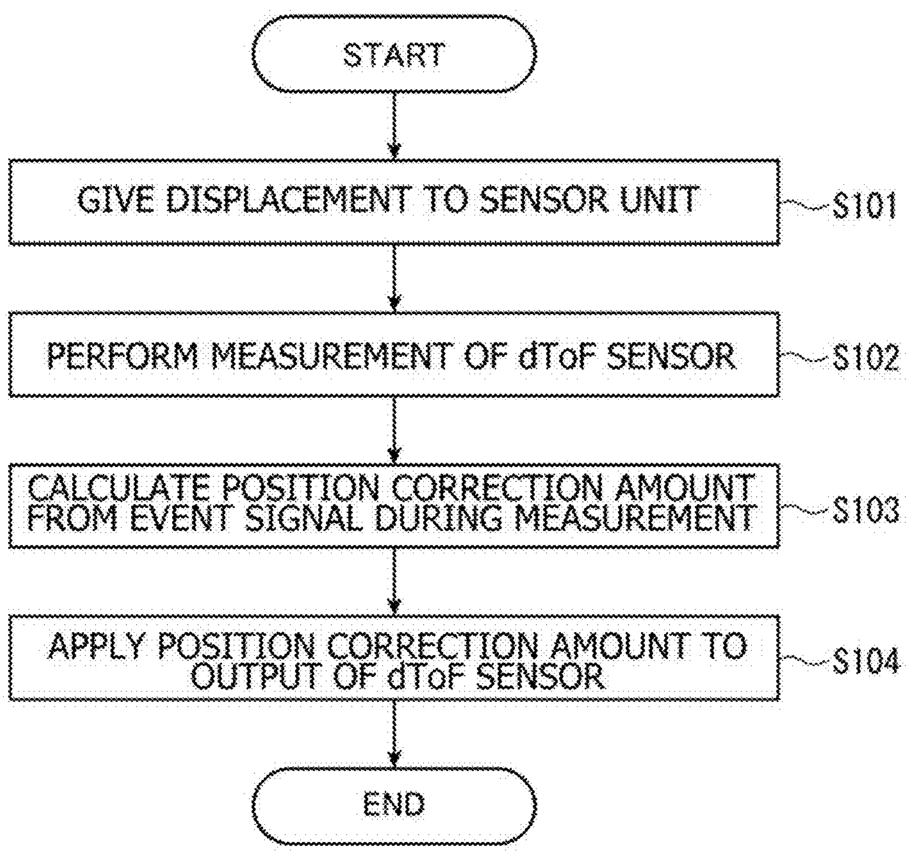
FIG. 4 is a flowchart illustrating a flow of the processing executed in the system illustrated in FIG. 1.

FIG. 4 is a flowchart illustrating a flow of processing executed in the system illustrated in FIG. 1. In the illustrated example, first, the processor 110 drives and causes the actuator 230 to give a displacement to the sensor unit including the dToF sensor 210 and the EVS 220 (step S101). In the illustrated example, the operation of the processor 110 does not include acquisition of the amount of displacement given by the actuator 230 at this time. That is, the processor 110 does not use information on the amount of displacement given by the actuator 230 in the subsequent processing. In addition, the processor 110 does not use information on the timing at which the displacement is given by the actuator 230 in the subsequent processing.

While the sensor unit is being displaced in step S101, the dToF sensor 210 performs measurement (step S102). Note that the application of displacement to the sensor unit does not necessarily trigger the measurement of the dToF sensor 210, and the dToF sensor 210 may perform measurement regardless of the presence or absence of displacement. The processor 110 calculates a position correction amount for the pixel position of the dToF sensor from the event signal generated by the EVS 220 during the measurement of the dToF sensor 210 (step S103). The output of the dToF sensor 210 and the event signal of the EVS 220 can be temporally associated with each other by using their respective time stamps, for example. If the output of the dToF sensor 210 and the event signal of the EVS 220 are associated with each other, since the timing and amount of displacement when the sensor unit is displaced can be identified, information on the timing and amount of displacement when the actuator 230 provides the displacement is not required, as described above.

Furthermore, the processor 110 applies the position correction amount to the output of the dToF sensor 210 (step S104). Here, the position correction amount corresponds to the displacement amounts $\Delta d_1$, $\Delta d_2$, and $\Delta d_3$ described above with reference to FIG. 3. In the output of the dToF sensor 210, although all measurement results are associated with the original pixel positions (lattice points having a pixel interval $d_p$ as illustrated in part (a) of FIG. 3), the processor 110 adds the position correction amounts corresponding to the displacement amounts $\Delta d_1$, $\Delta d_2$, and $\Delta d_3$ to the coordinate values indicating the pixel positions in respective measurement results (measurement results at times t2, t3, and t4 in the example of FIG. 3), so that the measurement results can be associated with pixel positions reflecting the displacement (illustrated in part (b) of FIG. 3).

In an embodiment of the present invention as described above, the amount of displacement given to the dToF sensor 210 is detected afterwards according to the event signal generated by the EVS 220, and a position correction amount corresponding to the amount of displacement is applied to the output of the dToF sensor 210, thereby increasing the spatial resolution of the dToF sensor 210. In the case of detecting the displacement afterwards by using the EVS 220, there is no need to precisely control the timing and amount of displacement applied to the sensor unit by the actuator 230, which simplifies the design and adjustment procedures.

Note that in other embodiments, instead of the dToF sensor in the above embodiment, other ToF sensors such as an iToF sensor or other sensors may be used. For example, the cases are considered where a sensor that can reduce the pixel interval, such as an image sensor, is used as a sensor with a large pixel interval by skipping the reading of some pixels in order to save power. Even in such cases, the embodiment of the present invention can be applied to maintain spatial resolution while continuing operation in a power-saving manner.

Although the embodiment of the present invention has been described in detail above with reference to the accompanying drawings, the present invention is not limited to such examples. It is clear that a person having ordinary knowledge in the technical field to which the present invention pertains can conceive of various modification or alteration examples within the scope of the technical ideas described in the claims, and it is understood that these also naturally belong to the technical scope of the present invention.

REFERENCE SIGNS LIST

10: System
100: Computer
110: Processor
120: Memory
130: Communication device
140: Recording medium
210: dToF sensor
220: EVS
230: Actuator

The invention claimed is:

1. A computer system for processing an output of a sensor generated for each of pixels, comprising:

a memory storing computer-readable instructions; and a processor for executing the computer-readable instructions that cause the computer system to perform operations comprising:

calculating a position correction amount for a pixel position of the sensor, according to an event signal generated by an event-based vision sensor whose positional relation with the sensor has been known, and applying the position correction amount to coordinate values indicating the pixel position of the sensor.

2. The computer system according to claim 1, wherein applying the position correction amount to the coordinate values includes adding the position correction amount to the coordinate values.

3. The computer system according to claim 1, wherein a unit of the position correction amount is smaller than a pixel interval of the sensor.

4. The computer system according to claim 1, wherein the operations further comprise driving an actuator that provides a displacement to the sensor and the event-based vision sensor.

5. The computer system according to claim 4, wherein the operations exclude obtaining an amount of the displacement.

6. The computer system according to claim 4, wherein the pixels of the sensor are arranged along a plane that includes a first direction and a second direction, and the displacement is predominant in the first direction.

7. The computer system according to claim 1, wherein the sensor is a dToF sensor.

8. A method comprising:
calculating a position correction amount for a pixel position of a sensor, according to an event signal generated by an event-based vision sensor whose positional relation with the sensor has been known; and
applying the position correction amount to coordinate values indicating the pixel position of the sensor.

9. A non-transitory computer-readable medium storing computer-readable instructions that, when
executed by a processor, cause a computer system to perform operations comprising:
calculating a position correction amount for a pixel position of a sensor, according to an event signal generated by an event-based vision sensor whose positional relation with the sensor has been known; and
applying the position correction amount to coordinate values indicating the pixel position of the sensor.

10. The method of claim 8, wherein a unit of the position correction amount is smaller than a pixel interval of the sensor.

11. The method of claim 8, further comprising driving an actuator that provides a displacement to the sensor and the event-based vision sensor.

12. The method of claim 11, wherein the method is performed without obtaining an amount of the displacement.

13. The method of claim 11, wherein
pixels of the sensor are arranged along a plane that includes a first direction and a second direction, and
the displacement is predominant in the first direction.

14. The method of claim 8, wherein the sensor is a dToF sensor.

15. The non-transitory computer-readable medium of claim 9, wherein a unit of the position correction amount is smaller than a pixel interval of the sensor.

16. The non-transitory computer-readable medium of claim 9, wherein the operations further include driving an actuator that provides a displacement to the sensor and the event-based vision sensor.

17. The non-transitory computer-readable medium of claim 16, wherein the operations exclude obtaining an amount of the displacement.

18. The non-transitory computer-readable medium of claim 16, wherein
pixels of the sensor are arranged along a plane that includes a first direction and a second direction, and
the displacement is predominant in the first direction.

19. The non-transitory computer-readable medium of claim 9, wherein the sensor is a dToF sensor.

* * * * *